(12) United States Patent
Herzinger

(10) Patent No.: US 9,921,352 B1
(45) Date of Patent: Mar. 20, 2018

(54) BIASED FAST AXIS RETARDER SYSTEM

(71) Applicant: J.A. WOOLLAM CO., INC., Lincoln, NE (US)

(72) Inventor: Craig M. Herzinger, Lincoln, NE (US)

(73) Assignee: J.A. WOOLLAM CO., INC., Lincoln, NE (US)

( * ) Notice: Subject to any disclaimer, the term of this patent is extended or adjusted under 35 U.S.C. 154(b) by 0 days.

(21) Appl. No.: 15/731,314

(22) Filed: May 23, 2017

Related U.S. Application Data

(60) Provisional application No. 62/392,435, filed on Jun. 1, 2016.

(51) Int. Cl.
*G02B 5/30* (2006.01)

(52) U.S. Cl.
CPC ................ *G02B 5/3083* (2013.01)

(58) Field of Classification Search
CPC .................................................. G02B 5/3083
USPC ..................................... 359/489.07
See application file for complete search history.

(56) References Cited

U.S. PATENT DOCUMENTS

| | | | | |
|---|---|---|---|---|
| 3,439,968 A * | 4/1969 | Horton | ............... | G02B 5/3066 359/352 |
| 4,778,263 A * | 10/1988 | Foltyn | ............... | G02B 5/285 359/580 |
| 5,251,058 A * | 10/1993 | MacArthur | ............... | H04N 1/036 347/239 |
| 5,946,098 A * | 8/1999 | Johs | ............... | G01J 4/00 356/364 |
| 6,118,537 A * | 9/2000 | Johs | ............... | G02B 5/3083 356/364 |
| 7,304,737 B1 * | 12/2007 | Liphardt | ............... | G01N 21/211 356/369 |
| 7,460,230 B2 * | 12/2008 | Johs | ............... | G02B 27/286 356/365 |
| 8,462,341 B2 * | 6/2013 | He | ............... | G01J 4/04 356/365 |

* cited by examiner

*Primary Examiner* — Ricky D Shafer
(74) *Attorney, Agent, or Firm* — James D. Welch

(57) ABSTRACT

A retarder system that comprises at least two plates, each of which comprise two surfaces that are parallel to, or substantially parallel to one another, said plates being tipped with respect to one another so that the surfaces of one thereof are not parallel to the surfaces of the other, each said plate further comprising a biased fast axis that is neither parallel to, or perpendicular to surfaces of said plates.

16 Claims, 3 Drawing Sheets

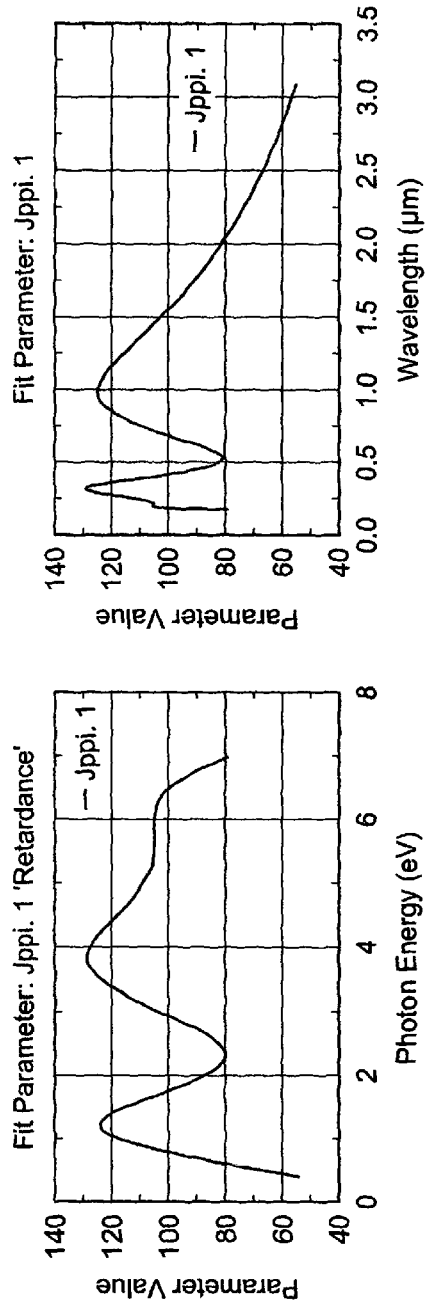
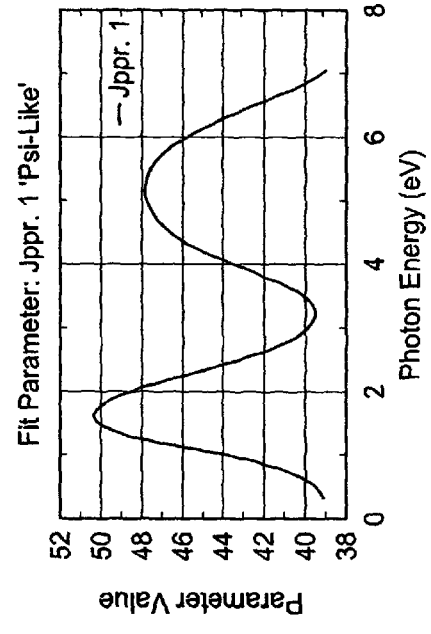
FIG. 1
FIG. 2
FIG. 3

BIASED FAST AXIS RETARDER SYSTEM

This Application Claims Benefit of Provisional Application No. 62/392,435 Filed Jun. 1, 2016.

TECHNICAL FILED

The present invention relates to systems for entering phase delay between orthogonal components of a polarized beam of electromagnetic radiation, and more particularly to a retarder system that comprises at least two plates, each of which comprise two surfaces that are parallel to, or substantially parallel to one another, said plates being tipped with respect to one another so that the surfaces of one thereof are not parallel to the surfaces of the other, at least one said plate further comprising a biased fast axis that is neither parallel to, or perpendicular to surfaces of said plates.

BACKGROUND

It is well known to apply Berek-type, and Non-Berek-type Plate retarders to enter phase delays between orthogonal components of a polarized beam of electromagnetism caused to pass therethrough, where Berek-type retarders are characterized by a Fast Axis thereof being ideally oriented perpendicular to surfaces of said Plates, and Non-Berek-type retarders are characterized by a Fast Axis being ideally oriented parallel to said surfaces. Often in the prior art two Berek-type Plates are tipped with respect to one another such that an incident beam of electromagnetic radiation enters the first side of a first plate and is refracted thereby so that it exits the second side thereof at a location offset from the incident beam, which beam exiting the second side of said first Plate then passes through the second Plate in a similar manner, where it is refracted such that the beam exiting from the second side thereof is essentially non-deviated and not offset from the original incident beam that entered the first side of said first Plate. However, the phase angle between the orthogonal components of said electromagnetic beam entering the first side of the first Plate, is changed by
passing through the system of two tipped Berek-type Plates. And often as well, two Non-Berek-type Plates are positioned with respect to one another such the surfaces thereof are substantially parallel to one another, and Fast Axes thereof are rotated about an axis that passes perpendicularly through said Plate surfaces. Again the beam exiting from the second side of a second plate in the succession of Plates is essentially non-deviated and not offset from the original incident beam that entered the first side of said first Plate. And, again, the phase angle between the orthogonal components of said electromagnetic beam entering the first side of the first Plate, is changed by passing through the system of at least two Non-Berek-type Plates which are rotated with respect to one another such that their Fast Axes are not in-line with one another.

The use of only multiple sequential Berek or Non-Berek-type retarders exclusively is conventional and is outside the scope of the present invention. The present invention however, while still involving use of at least two Plates in succession, said Plates each having two surfaces that are parallel to or substantially parallel to one another, differs in that in at least one, (preferably all) Plates present the Fast Axis is neither Perpendicular nor Parallel to said parallel or substantially parallel surfaces. Instead the Fast Axis of at least one Plate is at what is termed herein as a "Biased angle" which is an angle between 0.0 and +/−90 degrees, (excluding of course 0.0 and 90 degrees per se.), as related to the surfaces of and Fat Axis of Berek-type Plates.

A particularly relevant Patent is that to Herzinger et al., U.S. Pat. No. 5,835,222. This Patent teaches how to determine the orientation of a Fast Axis in a Retarder Plate.

A problem the present invention addresses is that in conventional Retarders constructed from purely Berek or Non-Berek-type Plates are limited as to the range over which they can provide significant retardance between orthogonal components of an electromagnetic beam. A need remains for a Retarder that can, for instance, provide significant retardance over a range of about 0.3 to 3.0+ microns.

DISCLOSURE OF THE INVENTION

The present invention is a retarder comprising sequentially at least one pair of plates, each said plate having first and second parallel or substantially parallel sides, said plates within a pair thereof being tipped with respect to one another such that an incident beam of electromagnetic radiation entering the first side of the first plate in said pair is refracted thereby so that it exits the second side of said first plate at a location offset from the incident beam, which beam exiting the second side of said first plate then enters the first side of the second plate wherein it is refracted such that the beam exiting from the second side of said second plate is essentially non-deviated and not offset from the original incident beam that entered the first side of said first Plate, said retarder being characterized in that the fast axis of each is neither perpendicular to nor parallel to said parallel or substantially parallel plate surfaces in said first and second plates, but rather is at a biased angle therebetween.

In use a phase angle between orthogonal components of said electromagnetic beam entering the first side of the first Plate, is changed by passing through at least one pair of plates, none of said plates being of a Berek-type or non-Berek-type having a fast axis perpendicular or substantially perpendicular to, or parallel or substantially parallel to the sides of a plate, respectively.

Said retarder can involve that there are two pairs of plates sequentially encountered by said beam of electromagnetic radiation.

Said retarder can involve that the first and second plates in each of the first pair of plates and the second pair of plates are each tipped with respect to one another at the same angle and that the beam exiting from the second side of the second plate in the second pair of plates is essentially non-deviated and not offset from the original incident beam that entered the first side of the first plate in the first pair of plates and the angle of incidence of the original beam to the first side of the first plate in the first pair of plates is the same as the angle of incidence of the beam exiting the second plate in the first pair of plates to the first side of the first plate in the second pair of plates.

Said retarder can involve that the first and second plates in each of the first pair of plates and the second pair of plates are each tipped with respect to one another at different angles, and wherein the beam exiting from the second side of the second plate in the second pair of plates is essentially non-deviated and not offset from the original incident beam that entered the first side of the first plate in the first pair of plates and the angle of incidence of the original beam to the first side of the first plate in the first pair of plates is different from the angle of incidence of the beam exiting the second plate in the first pair of plates to the first side of the first plate in the second pair of plates.

The present invention can involve that the entire retarder system is rotating about the locus of the input beam to the first side of the first plate in the first of said at least one pair of plates.

An alternative present invention retarder comprises sequentially at least one pair of plates, each said plate having first and second parallel or substantially parallel sides, said plates within a pair thereof being tipped with respect to one another such that an incident beam of electromagnetic radiation entering the first side of the first plate in said pair is refracted thereby so that it exits the second side of said first plate at a location offset from the incident beam, which beam exiting the second side of said first plate then enters the first side of the second plate wherein it is refracted such that the beam exiting from the second side of said second plate is essentially non-deviated and not offset from the original incident beam that entered the first side of said first Plate, said retarder being characterized in that the fast axis of at least one said plate is neither perpendicular to nor parallel to said parallel or substantially parallel plate surfaces in said first and second plates, but rather is at a biased angle therebetween.

In use a phase angle between orthogonal components of said electromagnetic beam entering the first side of the first Plate, is changed by passing through said at least one pair of plates, at least one said plates not being of a Berek-type or non-Berek-type having a fast axis perpendicular or substantially perpendicular to, or parallel or substantially parallel to the sides of a plate, respectively.

Said alternative retarder can involve that there are two pairs of plates sequentially encountered by said beam of electromagnetic radiation.

Said retarder can involve that the first and second plates in each of the first pair of plates and the second pair of plates are each tipped with respect to one another at the same angle and wherein the beam exiting from the second side of the second plate in the second pair of plates is essentially non-deviated and not offset from the original incident beam that entered the first side of the first plate in the first pair of plates and the angle of incidence of the original beam to the first side of the first plate in the first pair of plates is the same as the angle of incidence of the beam exiting the second plate in the first pair of plates to the first side of the first plate in the second pair of plates.

Said alternative retarder can involve that the first and second plates in each of the first pair of plates and the second pair of plates are each tipped with respect to one another at different angles, and wherein the beam exiting from the second side of the second plate in the second pair of plates is essentially non-deviated and not offset from the original incident beam that entered the first side of the first plate in the first pair of plates and the angle of incidence of the original beam to the first side of the first plate in the first pair of plates is different from the angle of incidence of the beam exiting the second plate in the first pair of plates to the first side of the first plate in the second pair of plates.

The present invention can involve that the entire alternative retarder system is rotating about the locus of the input beam to the first side of the first plate in the first of said at least one pair of plates.

The present invention will be better understood by reference to the Detailed Description Section of this Specification in combination with the Drawings.

BRIEF DESCRIPTION OF THE DRAWINGS

FIG. 1 shows a plot of Retardance vs. Photon Energy provided by a present invention retarder system.

FIG. 2 shows a plot of Retardance vs. Wavelength provided by a present invention retarder system.

FIG. 3 shows a plot of Psi-like effects vs. Photon energy provided by a present invention retarder system.

DETAILED DESCRIPTION

Turning now to the Drawings, FIG. 1 shows a plot of Retardance vs. Photon Energy. FIG. 2 shows a plot of this Retardance vs. Wavelength for a demonstrative present invention Retarder. The important thing to note is that at a wavelength of 3 Microns there is significant Retardance capability present, and that the Retardance is within a range between about 0.3 to 3.0+ microns which can be beneficially applied in Ellipsometer and the like systems. FIGS. 1 and 2 demonstrate a primary benefit of the present invention, which has not proven to be possible to achieve when Berek or Non-Berek Retarders are used exclusively in realizing Retarders. This is not to say that, for instance, at least one plate in a present invention Retarder system could not be a of a Berek or Non-Berek-type, only that in the preferred embodiment this is not the case.

FIG. 3 shows a plot of Psi-like effects vs. Photon energy for the demonstrative present invention Retarder.

Figure 4:
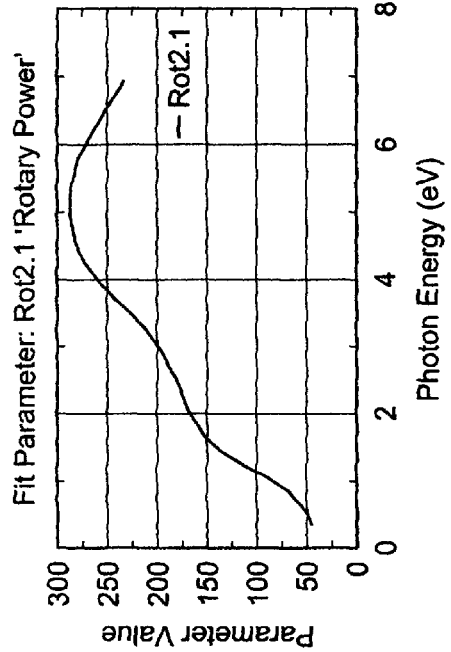
FIG. 4 shows a plot of Fast Axis Rotation vs. Photon Energy provided by a present invention retarder system.

FIG. 4 shows a plot of Fast Axis Rotation vs. Photon Energy for the demonstrative present invention Retarder.

Figure 5:
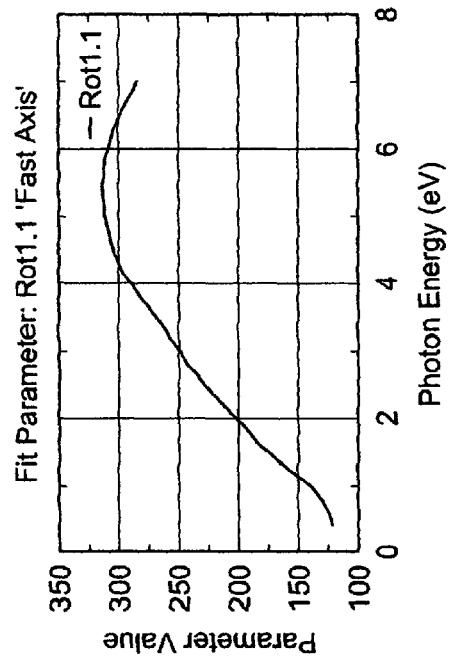
FIG. 5 shows a plot of Rotary Power vs. Photon Energy provided by a present invention retarder system.

FIG. 5 shows a plot of Rotary Power vs. Photon Energy for the demonstrative present invention Retarder.

Figure 6:
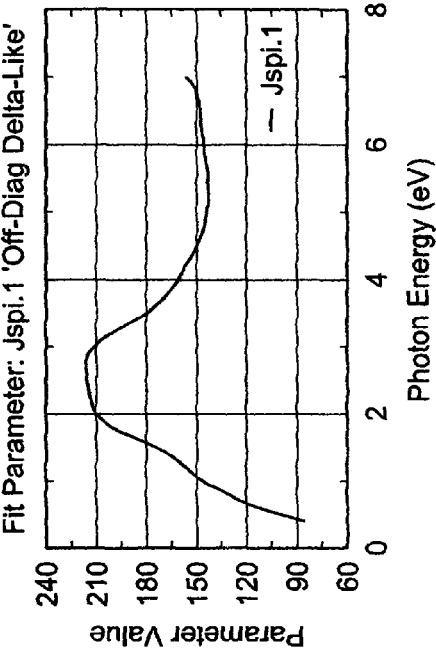
FIG. 6 shows a plot of off-diagonal Psi-like effects vs Photon Energy provided by a present invention retarder system.

FIG. 6 shows a plot of off-diagonal Psi-like effects vs Photon Energy for the demonstrative present invention Retarder.

Figure 7:
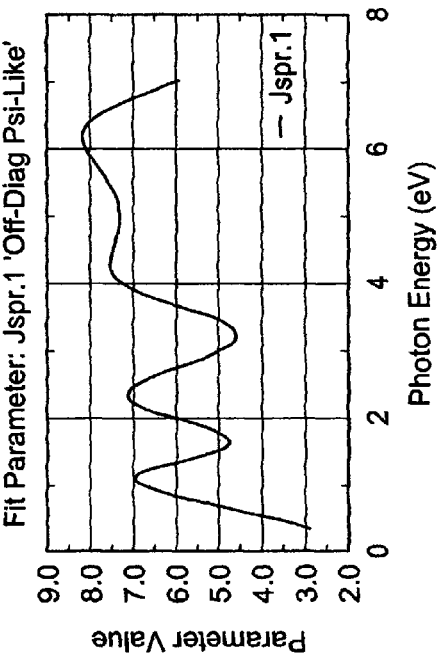
FIG. 7 shows a plot of off-diagonal Delta-like effects vs Photon Energy provided by a present invention retarder system.

FIG. 7 shows a plot of off-diagonal Delta-like effects vs Photon Energy for the demonstrative present invention Retarder.

Figure 8:
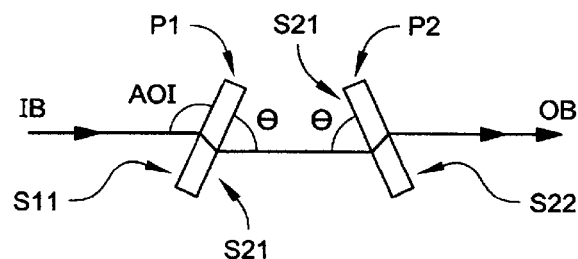
FIG. 8 shows a single pair of Plates (P1) P2) present invention retarder system.

FIG. 8 shows a one pair of Plates (P1) P2) present invention retarder system in which Plate (P1) has parallel Sides (S1) and (S12).

Figure 9:
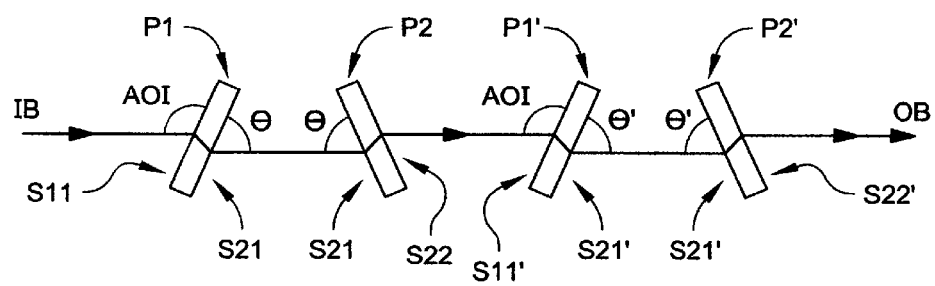
FIG. 9 shows a two pair of Plates (P1) (P2) and (P1') (P2') present invention retarder system.

FIG. 9 shows a two pair of Plates (P1) (P2) and (P1') (P2') present invention retarder system. Plate (P1) has parallel Sides (S11) and (S12) and Plate 2 has Sides (S21) and (S22). Plate (P1') has parallel Sides (S11') and (S12') and Plate (P2') has parallel Sides (S21') and (S22'). It is noted that angles Theta (-) and (-)' can be different. That is one pair of Plates (P1) and (P2) can be tipped with respect to one another at angle (-) and Plates (P1') and P2)' at angle (-)'.

Figures 10A, 10B, 10C, 10D:
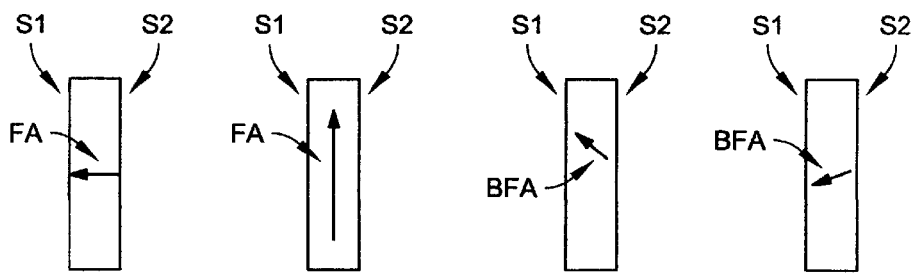
FIG. 10a shows a demonstrative Berek-type Retarder Fast Axis (FA).
FIG. 10B shows a demonstrative Nori-Berek-type Retarder Fast Axis (FA).
FIGS. 10C and 10D show demonstrative Biased Fast Axes (FA).

FIG. 10A shows a demonstrative Berek-type Retarder Fast Axis (FA) perpendicular to the parallel Sides (S1) and (S2).

FIG. 10B shows a demonstrative Non-Berek-type Retarder Fast Axis (FA) parallel to the parallel Sides (S1) and (S2).

FIGS. 10C and 10D show demonstrative Biased Fast Axes (FA). Note, any Fast Axis other than as shown in FIGS. 10A and 10B is a Biased Fast Axis (FA) to the parallel Sides (S1) and (S2).

Note, when rotating, a present invention Retarder rotates about the locus of the Input Beam (IB), which forms an Angle-of-Incidence to the first side (S11) of the first Plate (P1), and Output Beam (OB) which exits the second side of the second plate in the second (P2) of said at least one pair of plates, or the second Plate (P2') in a second pair of Plates ((P1') (P2')), which Input (IB) and Output (OB) beams are substantially co-linear.

Finally, it is within the scope of the present invention to have one or more Derek or Non-Berek-type Plates involved in a FIG. 8 or 9 configuration. However, at least one, (and preferably all), Plate having a Biased Fast Axis Plate must be present at a (P1), (P2), (P1') or (P2') location in FIG. 8 or 9. Further, angles (θ) and (θ') are indicated in FIGS. 8 and 9 to show how an electromagnetic beam approaches the first sides of the various Plates (P1), (P2), (P1') or (P2'). Note that (θ) and (θ') can be the same, or different.

Finally, for insight, it is noted that true Berek-type retarders, (ie. wherein the fast axis is perpendicular to the face of the plate, see FIG. 10a), are used by tipping the plate "a little" so the angle the beam makes with the fast axis is very small. The causes the dispersion angle range for wavelengths to also be also small. The present invention positions the fast axis in the plate as in FIGS. 10c and 10d, such that good retardance is achieved at a larger range of plate tin angles, as as the fast axis thereof is more aligned with an average internal angle of a beam in the plate. This allows for wavelength dispersion tailoring to provide a spectrum that yields a more ideal range of values. Note, θ- and θ' in typical present invention use will typically be smaller, rather than larger as shown in FIGS. 8 and 9. That is, the plate (P1, P1', P2, P2') tips can be larger than if a FIG. 10a true Berek plate were used, which enables achieving better wavelength dispersion.

Having hereby disclosed the subject matter of the demonstrative present invention, it should be obvious that many modifications, substitutions, and variations of the demonstrative present invention are possible in view of the teachings. It is therefore to be understood that the invention may be practiced other than as specifically described, and should be limited in its breadth and scope only by the Claims.

The invention claimed is:

1. A retarder comprising sequentially at least one pair of plates, each said plate having first and second parallel or substantially parallel sides, said plates within a pair thereof being tipped with respect to one another such that an incident beam of electromagnetic radiation entering the first side of the first plate in said pair is refracted thereby so that it exits the second side of said first plate at a location offset from the incident beam, the beam exiting the second side of said first plate then enters the first side of the second plate wherein it is refracted such that the beam exiting from the second side of said second plate is essentially non-deviated and not offset from the incident beam that entered the first side of said first plate, said retarder being characterized in that a fast axis of each said plate is neither perpendicular to nor parallel to said parallel or substantially parallel side of said first and second plates, but rather is at a biased angle therebetween;

such that in use a phase angle between orthogonal components of said electromagnetic beam entering the first side of the first plate, is changed by passing through at least one pair of plates, none of said plates being of a Berek-type or non-Berek-type having a fast axis perpendicular or substantially perpendicular to, or parallel or substantially parallel to the sides of a plate, respectively.

2. A retarder as in claim 1, in which there are two pairs of plates sequentially encountered by said beam of electromagnetic radiation.

3. A retarder as in claim 2, in which the first and second plates in each of the first pair of plates and the second pair of plates are each tipped with respect to one another at a same angle and wherein the beam exiting from the second side of the second plate in the second pair of plates is essentially non-deviated and not offset from the incident beam that entered the first side of the first plate in the first pair of plates and an angle of incidence of the incident beam to the first side of the first plate in the first pair of plates is the same as the angle of the beam exiting the second plate in the first pair of plates to the first side of the first plate in the second pair of plates.

4. A retarder as in claim 3 in which the entire retarder is rotating about a locus of the incident beam to the first side of the first plate in the first of said at least one pair of plates.

5. A retarder as in claim 2, in which the first and second plates in each of the first pair of plates and the second pair of plates are each tipped with respect to one another at different angles, and wherein the beam exiting from the second side of the second plate in the second pair of plates is essentially non-deviated and not offset from the incident beam that entered the first side of the first plate in the first pair of plates and an angle of incidence of the incident beam to the first side of the first plate in the first pair of plates is different from the angle of the beam exiting the second plate in the first pair of plates to the first side of the first plate in the second pair of plates.

6. A retarder as in claim 5 in which the entire retarder is rotating about a locus of the incident beam to the first side of the first plate in the first of said at least one pair of plates.

7. A retarder as in claim 2 in which the entire retarder is rotating about a locus of the incident beam to the first side of the first plate in the first of said at least one pair of plates.

8. A retarder as in claim 1 in which the entire retarder is rotating about a locus of the incident beam to the first side of the first plate in the first of said at least one pair of plates.

9. A retarder comprising sequentially at least one pair of plates, each said plate having first and second parallel or substantially parallel sides, said plates within a pair thereof being tipped with respect to one another such that an incident beam of electromagnetic radiation entering the first side of the first plate in said pair is refracted thereby so that it exits the second side of said first plate at a location offset from the incident beam, the beam exiting the second side of said first plate then enters the first side of the second plate wherein it is refracted such that the beam exiting from the second side of said second plate is essentially non-deviated and not offset from the incident beam that entered the first side of said first plate, said retarder being characterized in that a fast axis of at least one of said plates is neither perpendicular to nor parallel to said parallel or substantially parallel side of said first and second plates, but rather is at a biased angle therebetween;

such that in use a phase angle between orthogonal components of said electromagnetic beam entering the first side of the first plate, is changed by passing through at least one pair of plates, at least one said plates not being of a Berek-type or non-Berek-type having a fast axis perpendicular or substantially perpendicular to, or parallel or substantially parallel to the sides of a plate, respectively.

10. A retarder as in claim 9, in which there are two pairs of plates sequentially encountered by said beam of electromagnetic radiation.

11. A retarder as in claim 10, in which the first and second plates in each of the first pair of plates and the second pair of plates are each tipped with respect to one another at a same angle and wherein the beam exiting from the second side of the second plate in the second pair of plates is essentially non-deviated and not offset from the incident beam that entered the first side of the first plate in the first pair of plates and an angle of incidence of the incident beam to the first side of the first plate in the first pair of plates is the same as the angle of the beam exiting the second plate in the first pair of plates to the first side of the first plate in the second pair of plates.

12. A retarder as in claim 11 in which the entire retarder is rotating about a locus of the incident beam to the first side of the first plate in the first of said at least one pair of plates.

13. A retarder as in claim 10, in which the first and second plates in each of the first pair of plates and the second pair of plates are each tipped with respect to one another at different angles, and wherein the beam exiting from the second side of the second plate in the second pair of plates is essentially non-deviated and not offset from the incident beam that entered the first side of the first plate in the first pair of plates and an angle of incidence of the incident beam to the first side of the first plate in the first pair of plates is different from the angle of the beam exiting the second plate in the first pair of plates to the first side of the first plate in the second pair of plates.

14. A retarder as in claim 13 in which the entire retarder is rotating about a locus of the incident beam to the first side of the first plate in the first of said at least one pair of plates.

15. A retarder as in claim 10 in which the entire retarder is rotating about a locus of the incident beam to the first side of the first plate in the first of said at least one pair of plates.

16. A retarder as in claim 9 in which the entire retarder is rotating about a locus of the incident beam to the first side of the first plate in the first of said at least one pair of plates.

* * * * *